(12) United States Patent
Gleitman et al.

(10) Patent No.: US 11,225,865 B2
(45) Date of Patent: Jan. 18, 2022

(54) IN-SITU GEOMECHANICAL TESTING

(71) Applicant: Halliburton Energy Services, Inc., Houston, TX (US)

(72) Inventors: Daniel D. Gleitman, Houston, TX (US); Gang Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 27 days.

(21) Appl. No.: 16/590,716

(22) Filed: Oct. 2, 2019

(65) Prior Publication Data

US 2020/0045670 A1 Feb. 6, 2020

Related U.S. Application Data

(62) Division of application No. 14/768,069, filed as application No. PCT/US2013/033333 on Mar. 21, 2013, now Pat. No. 10,472,959.

(51) Int. Cl.
*E21B 49/00* (2006.01)
*H04W 68/00* (2009.01)
(Continued)

(52) U.S. Cl.
CPC .......... *E21B 49/006* (2013.01); *E21B 49/00* (2013.01); *H04L 1/1812* (2013.01); *H04W 24/02* (2013.01); *H04W 36/0088* (2013.01); *H04W 68/005* (2013.01); *H04W 76/27* (2018.02); *H04W 76/30* (2018.02); *E21B 47/022* (2013.01); *H04L 1/00* (2013.01); *H04W 68/00* (2013.01); *H04W 72/04* (2013.01)

(58) Field of Classification Search
CPC .......... E21B 43/11; E21B 47/00; E21B 47/01; E21B 47/013; E21B 49/00; E21B 49/02; E21B 49/04; E21B 49/06
See application file for complete search history.

(56) References Cited

U.S. PATENT DOCUMENTS 2,927,459 A 3/1960 Farrington
3,446,062 A 5/1969 Goodman
(Continued)

FOREIGN PATENT DOCUMENTS

EP 0994238 A2 3/2005

OTHER PUBLICATIONS

Extended European Search Report Issued in corresponding application No. 13879226.2, dated Nov. 28, 2016, 9 pgs.
(Continued)

*Primary Examiner* — Tara Schimpf
(74) *Attorney, Agent, or Firm* — Chamberlain Hrdlicka

(57) ABSTRACT

A method of testing mechanical properties of an earth formation can include disposing a probe in a wellbore, impacting the probe against a wall of the wellbore, and measuring a parameter related to at least one of a displacement, displacement rate, strain, and strain rate, of at least one of the probe and the formation. Another method can include disposing a probe and a known material in a wellbore, and after the disposing, penetrating the known material with the probe. Another method can include disposing a probe in a wellbore, measuring a displacement of the probe into a wall of the wellbore while measuring a load applied to the probe, and applying fluid pressure to the formation via the probe.

11 Claims, 15 Drawing Sheets

(51) Int. Cl.
  *H04W 24/02*   (2009.01)
  *H04W 36/00*   (2009.01)
  *H04W 76/30*   (2018.01)
  *H04L 1/18*    (2006.01)
  *H04W 76/27*   (2018.01)
  *H04W 72/04*       (2009.01)
  *H04L 1/00*        (2006.01)
  *E21B 47/022*      (2012.01)

(56) References Cited

U.S. PATENT DOCUMENTS

| | | | |
|---|---|---|---|
| 3,466,926 | A | 9/1969 | Ruppeneit |
| 3,785,200 | A | 1/1974 | Handy |
| 4,149,409 | A | 4/1979 | Serata |
| 4,461,171 | A | 7/1984 | De La Cruz |
| 4,625,795 | A | 12/1986 | Despax et al. |
| 4,800,753 | A | 1/1989 | Despax et al. |
| 5,042,595 | A | 8/1991 | Ladanyi |
| 5,165,274 | A | 11/1992 | Thiercelin |
| 5,207,104 | A | 5/1993 | Enderlin |
| 5,323,648 | A | 6/1994 | Peltier |
| 6,041,860 | A | 3/2000 | Nazzal et al. |
| 6,164,126 | A | 12/2000 | Ciglenec et al. |
| 7,946,357 | B2 * | 5/2011 | Trinh .................. E21B 45/00 175/50 |
| 2003/0098156 | A1 * | 5/2003 | Follini ............... E21B 17/1014 166/264 |
| 2004/0237640 | A1 | 12/2004 | Meister |
| 2005/0109538 | A1 | 5/2005 | Fisseler et al. |
| 2005/0194134 | A1 | 9/2005 | McGregor et al. |
| 2006/0076132 | A1 | 4/2006 | Nold, III et al. |
| 2007/0215349 | A1 | 9/2007 | Reid et al. |
| 2008/0314137 | A1 | 12/2008 | Proett et al. |
| 2009/0283266 | A1 | 11/2009 | Nold, III et al. |
| 2010/0051347 | A1 * | 3/2010 | Tchakarov .............. E21B 49/06 175/50 |
| 2011/0048969 | A1 | 3/2011 | Lawrence et al. |
| 2011/0100623 | A1 | 5/2011 | Bebb |
| 2011/0107830 | A1 | 5/2011 | Fields et al. |

OTHER PUBLICATIONS

International Search Report issued in corresponding application No. PCT/US2013/033333, dated Nov. 27, 2013, 3 pages.

\* cited by examiner

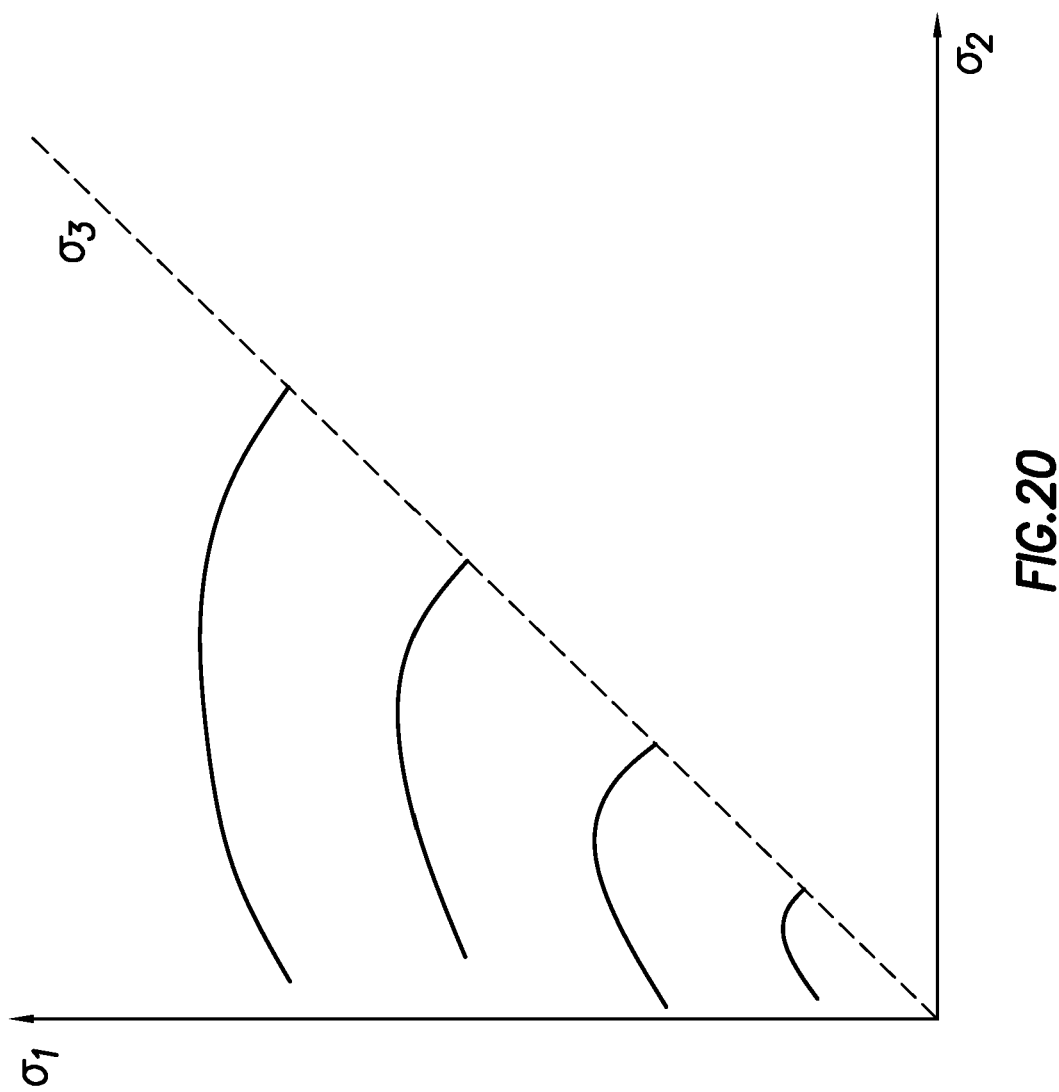

IN-SITU GEOMECHANICAL TESTING

TECHNICAL FIELD

This disclosure relates generally to equipment utilized and operations performed in conjunction with a subterranean well and, in one example described below, more particularly provides for in-situ geo-mechanical testing.

BACKGROUND

It can be useful to determine mechanical properties of an earth formation being drilled into. In one way or another, most operations performed at a well, from drilling to production, are affected by mechanical properties of formations.

Therefore, it will be appreciated that advancements are continually needed in the art of testing mechanical properties of subterranean formations.

BRIEF DESCRIPTION OF THE DRAWINGS

FIG. 20 is a representative plot of a formation failure envelope with different confining in-situ stresses.

DETAILED DESCRIPTION

Figure 1:
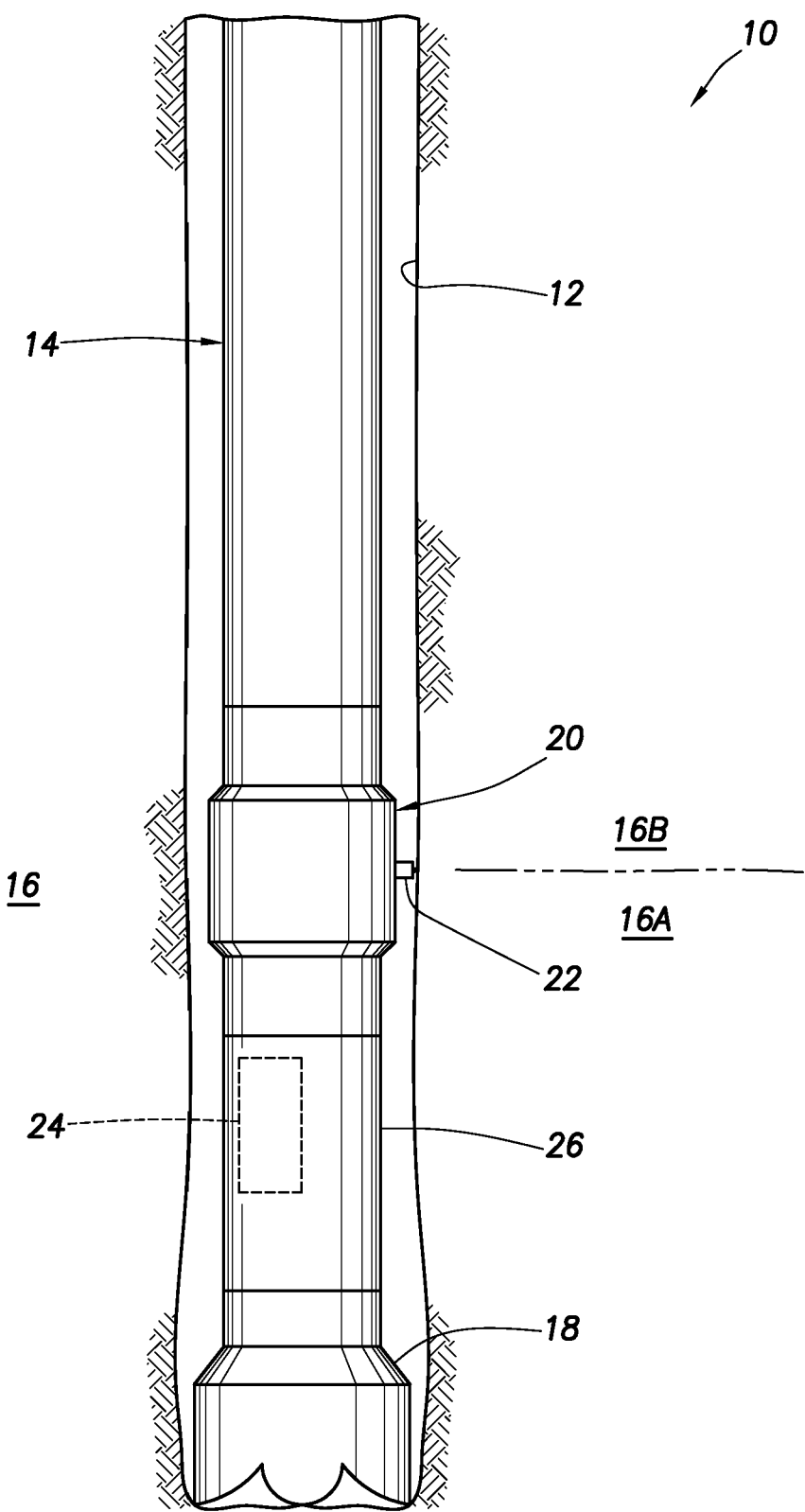
FIG. 1 is a representative partially cross-sectional view of a well drilling system and associated method which can embody principles of this disclosure.

Representatively illustrated in FIG. 1 is a system 10 and an associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 is drilled by a drill string 14 cutting into an earth formation 16. For this purpose, a drill bit 18 is connected at a distal end of the drill string.

In other examples, the wellbore 12 could be drilled by other types of drill strings (such as, jet cutting drill strings, impact-type drill strings, etc.). Thus, the scope of this disclosure is not limited to the drill string 14 as depicted in the drawings and/or described herein.

In the example illustrated in FIG. 1, the drill bit 18 is rotated by rotating the drill string 14 (e.g., using a rotary table or top drive at or near the earth's surface, etc.) and/or by rotating a lower section of the drill string with a downhole motor (e.g., a Moineau-type positive displacement motor, a turbine motor, etc.). In other examples, the drill string 14 may not be rotated to drill the wellbore 12. In some examples, the drill string 14 may comprise one or both of jointed pipe and coiled tubing.

It would be useful to be able to measure mechanical properties of the formation 16. One purpose (among many others) for such measurements can be to detect a boundary between different strata 16A,B of the formation 16, or to detect a variation of a mechanical property within a single strata.

The drill string 14 includes a test instrument 20 for testing the mechanical properties of the formation 16, or of any other formation penetrated by the wellbore 12. The instrument 20 includes a probe 22 which extends outwardly from the instrument into contact with a wall of the wellbore 12, and which preferably penetrates somewhat into the formation 16.

Displacement of the probe 22 into the wall of the wellbore 12 can be controlled by a controller 24. The controller 24 can include electronics, software, memory, etc., for displacing the probe 22 and for recording measurements made by various sensors of the instrument 20. The controller 24 can be included in a drilling tool 26, such as a logging-while-drilling (LWD) or measurement-while-drilling (MWD) tool, preferably with telemetry or other wired or wireless communication capabilities for transmitting measurements, data, etc., to an operator at a remote location (such as the earth's surface). In other examples, all or a portion of the controller 24 may be located elsewhere along the drill string 14, or at the earth's surface. The drill string 14 may comprise wired pipe, such as that marketed by Intelliserv, National Oilwell Varco, Houston, Tex. USA.

The probe 22 can extend outwardly and penetrate the wellbore 12 wall while the drill string 14 does not rotate, while the drill string rotates, while the drill string is advancing along the wellbore, and/or while the drill string is not advancing along the wellbore (e.g., with the drill bit 18 off bottom). Multiple azimuthally spaced apart probes 22 may be used in other examples, so that any anisotropy (e.g., bed boundaries, variations in properties within a bed, natural faults or fractures, etc.) in the formation 16 exposed to the wellbore 12 can be detected. The probe(s) 22 can be used to measure the mechanical properties of the formation 16 at multiple longitudinally spaced apart locations, for example, as the wellbore 12 is being drilled further into the formation 16, or into another formation.

Figure 2:
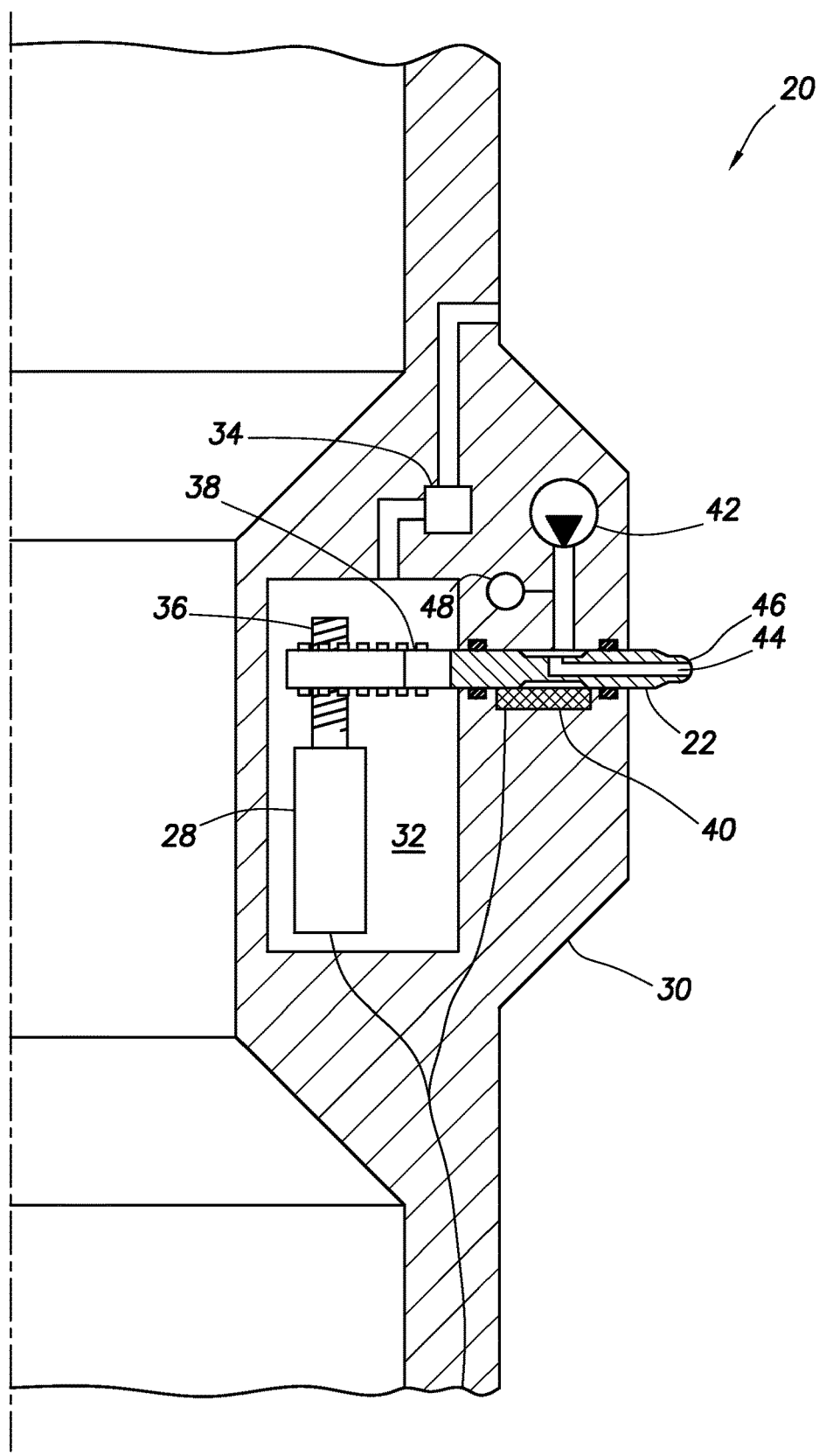
FIG. 2 is a representative cross-sectional view of an example of a testing instrument which can embody the principles of this disclosure.

Referring additionally now to FIG. 2, one example of the instrument 20 is representatively illustrated in a cross-sectional view. In this view, it may be seen that an electric motor 28 is used to displace the probe 22 laterally relative to a housing 30 of the instrument 20.

The motor 28 is positioned in a dielectric-filled chamber 32. A pressure equalization device 34 (such as a floating piston, a membrane, a bellows, a labyrinthine path, etc.) is used to equalize pressures between the chamber 32 and an exterior of the housing 30, which may decrease pressure differentials across dynamic seals and associated drag.

The motor 28 displaces the probe 22 via a displacement device 36 (such as, rack and pinion gearing, etc.). In other examples, the motor 28 could displace the probe 22 directly, or via another type of displacement device, hydraulics or other means of displacing the probe could be used, etc. A dashpot or other device may be employed to control or limit the rate of displacement. The motor 28 may be controlled in a manner to displace the probe 22 at varying rates, e.g., an initial rapid rate to approach the formation 16, and then a highly controlled (e.g., slower) rate to engage the formation. Thus, the scope of this disclosure is not limited to any particular manner of displacing the probe 22.

A load applied to the probe 22 is measured by means of a force or load sensor 38. Displacement of the probe 22 is measured by a proximity or displacement sensor 40, such as a linear variable displacement transducer or extensometer.

In some examples, the displacement sensor 40 can include a digital encoder to measure rotation of a shaft of the motor 28. A Fabry-Perot optical cavity coupled to the probe 22 may be used for high precision displacement sensing.

Displacement of probe 22 may be sensed by various means including those mentioned herein, and multiple displacement measurements versus time can be obtained to determine displacement rate (i.e. velocity). In some examples, the rate of displacement and loading of the probe 22 may be restricted (e.g., using a dashpot) to be around 0.0001 inch/sec, and preferably not more than 0.01 inch/sec, as it makes and maintains contact with the formation 16.

The probe 22 may be used to indent the formation 16 with a controlled force or load. The force may be maintained for a specific dwell time, which may be 1 to 20 seconds, and typically 10 to 15 seconds. The probe tip may be configured as described more fully below, and different sizes and/or shapes of probe tips may be used to gain information on a heterogeneity of the formation.

The formation 16 Brinnell hardness number may be determined or inferred from the controlled or measured force or load divided by the surface area of the indentation (i.e. depending upon probe tip size and shape), and may be reported without units. Typical Brinnell numbers for different formations range from 10 to 80, and will increase as the formation gets harder.

In some examples, the load sensor 38 can include a piezoelectric element or strain gauge on the probe 22. Current and/or electrical power delivered to the motor 28 may be used to determine the load applied to the probe 22. If the probe 22 is instead displaced by means of a piston, then pressure applied to the piston may be used as an indicator of load applied to the probe 22.

In some examples, load applied to the probe 22 can be measured in multiple directions, such as both axial and lateral relative to the probe. Friction force (e.g., due to seal drag, etc.) may also be measured, so that this can be compensated for in the determination of mechanical properties.

In some examples, a pump or other type of pressure source 42 is connected to a flow passage 44 which extends in the probe 22 to a tip 46 of the probe. When the probe 22 is displaced outward, so that the tip 46 of the probe penetrates the formation 16, pressure can be applied from the pressure source 42 to the formation via the flow passage 44, for example, to test injectability of the formation, fracture pressure of the formation, etc. This configuration may also or alternatively be used to displace mud cake or other materials from the wellbore 12 wall.

In a fracture pressure test, pressure can be applied from the pressure source 42 to the formation 16 until the formation fractures. The pressure can be measured by a pressure sensor 48 in communication with the passage 44. Fracturing can be indicated by a sudden decrease in pressure as measured by the sensor 48.

Using the measurements made by the load and displacement sensors 38, 40, properties such as Brinnell hardness, compressive strength, bulk modulus, fracture toughness, yield point, etc., can be conveniently examined in real time, as the drilling operation progresses. Thus, it is not necessary to retrieve the drill string 14 and convey another test instrument (e.g., a wireline logging tool) or test string into the wellbore 12 to perform the tests.

The in-situ real time data may be more useful than merely relying upon testing from a mechanical lab on core samples from the field which may have been done previously (e.g., from an offset well), but not in the wellbore 12 and at the wellbore depth being drilled at the moment, or may be done subsequently, when decisions which would benefit from the real time data have already passed. The in-situ testing may be used in conjunction with laboratory core testing or wireline tool-based testing, for purposes of calibration of the real time measurements or for enhanced formation evaluation.

The aforementioned examination of various mechanical properties may be a determination of a value of a property, or a correlative indication relating to a property. It may be quantitative or qualitative. It may be absolute or relative. It may be calibrated or un-calibrated. It may be combined with other inputs, such as data from similar locations in the borehole, from other sensors such as those that detect resistivity, natural gamma, density, neutron porosity, acoustic properties, formation pressure, formation fluid analysis, or nuclear magnetic resonance (NMR) data.

Figure 3:
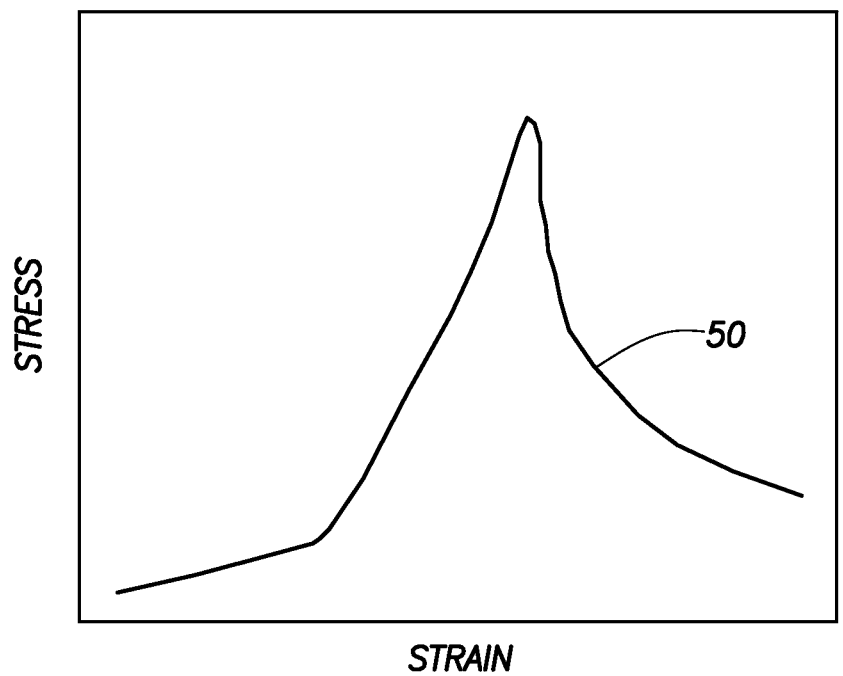
FIGS. 3 & 4 are representative plots of stress versus strain for different strata of an earth formation.
Figure 4:
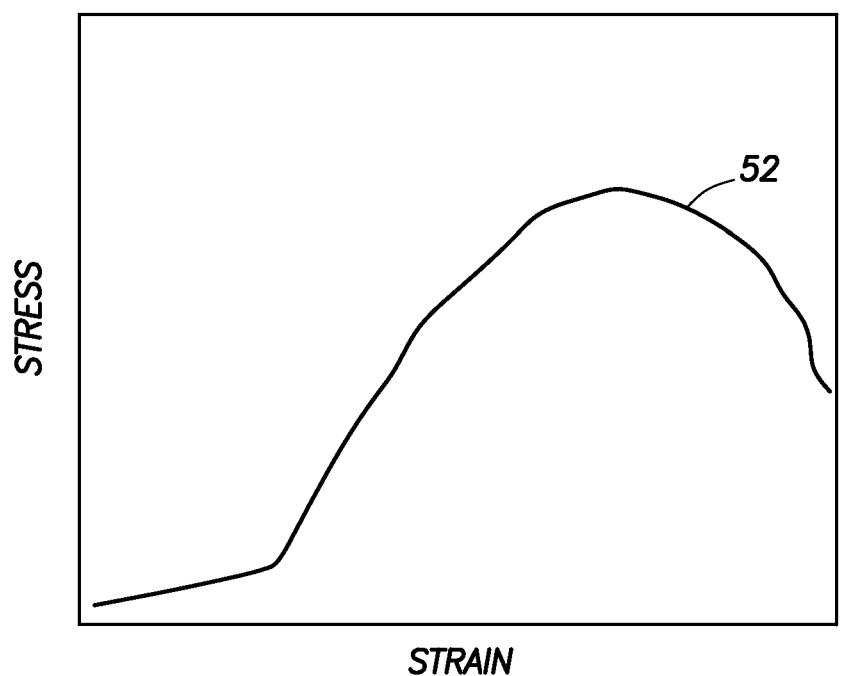

Referring additionally now to FIGS. 3 & 4, plots 50, 52 of stress versus strain for the two different strata 16A,B are representatively illustrated. The stress and strain represented in FIGS. 3 & 4 are related to the load and displacement measurements, respectively, made by the load and displacement sensors 38, 40 of the instrument 20. A precise correlation between the sensor 38, 40 measurements and stress and strain in a formation can be empirically determined for a particular instrument with a particular probe 22 and probe tip 46.

Methods of calibrating a probe tip, stress and strain model may include testing (e.g. in a lab setting) against rock samples obtained from cores or cuttings from the same field (e.g. from the same well, an offset well, or an outcrop), or testing against rock standards. In-situ benchmark values may be established for a stratum or portion of a wellbore of known (e.g. from core or from other sensors) properties. Benchmark values may be established from a stratum or a portion of a wellbore whose properties are not known independently, to be a base from which the properties of other strata or wellbore sections may be examined on a relative basis.

Plot 50 for strata 16B indicates that the formation 16 at this location is relatively brittle, since the stress builds relatively steeply and decreases relatively steeply after achieving a maximum level. In contrast, plot 52 for strata 16A indicates that the formation 16 at this location is relatively ductile, since the stress builds more gradually, and decreases more gradually after achieving a maximum.

Figure 5:
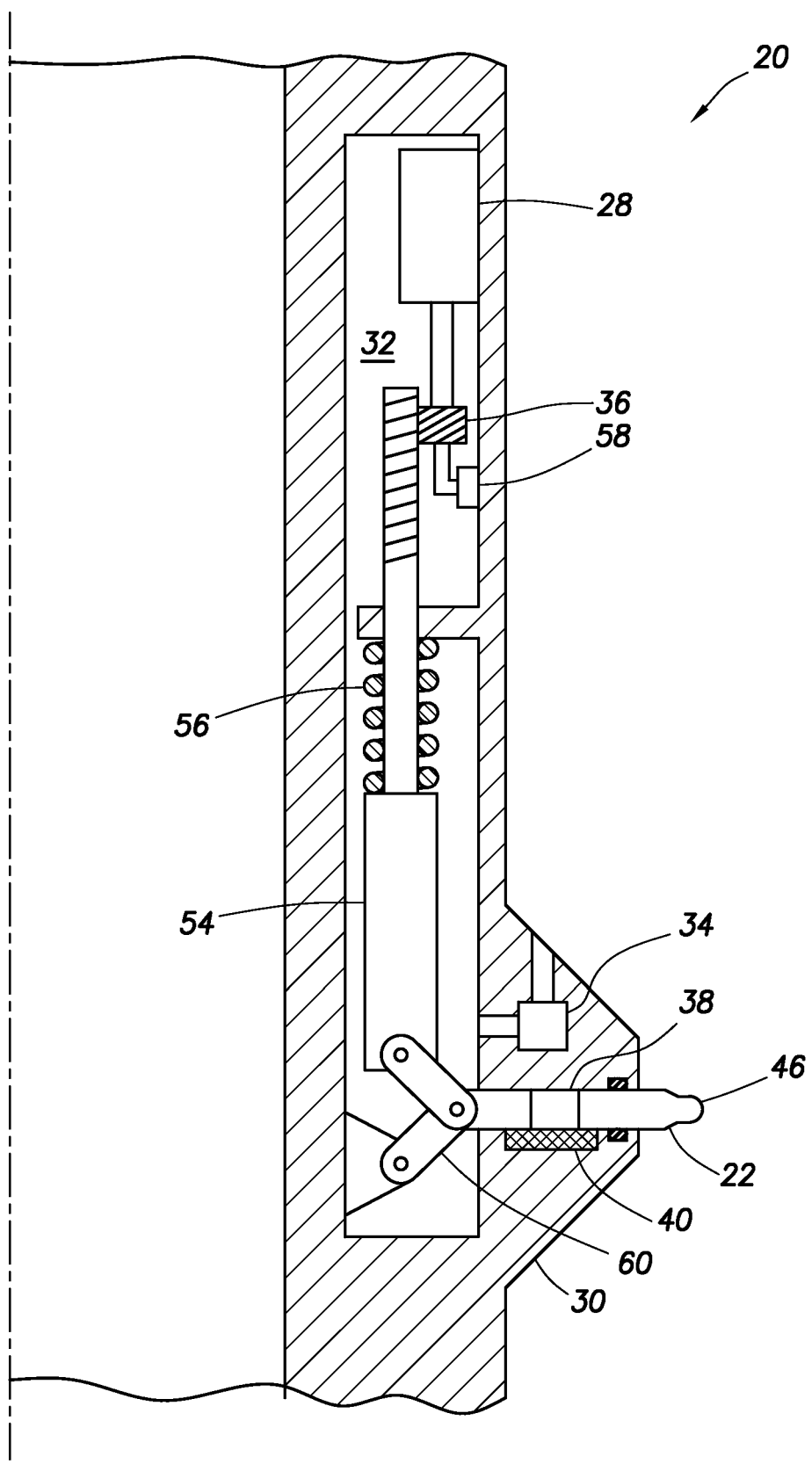
FIG. 5 is a representative cross-sectional view of another example of the test instrument.

Referring additionally now to FIG. 5, another example of the instrument 20 is representatively illustrated. In this example, the probe 22 is displaced outwardly very rapidly, so that the probe impacts the wall of the wellbore 12. Measurement of load and displacement during such an impact can provide useful information for determining the mechanical properties of the formation 16.

The motor 28 in this example does not displace the probe 22 into contact with the wall of the wellbore 12. Instead, the motor 28 displaces a relatively large mass 54 (e.g., formed of tungsten or another high molecular weight material) against a biasing force exerted by a biasing device 56 (such as, a spring, a pressurized chamber, etc.).

Energy is, thus, stored in the biasing device 56, until a release device 58 (such as, a solenoid, etc.) disengages the displacement device 36 and allows the stored energy to accelerate the mass 54. A mechanical linkage 60 translates longitudinal motion of the mass 54 into lateral motion of the probe 22.

The probe 22 may, thus, be displaced outwardly, to a predefined or a measured velocity, and into contact with the formation 16. A return spring or other device (not shown) may be used to bias the probe 22 to return subsequent to an actuation.

Displacement of the mass 54, linkage 60, or probe 22 may be measured at multiple times during the probe's displacement and prior to it impacting, as it impacts, and following its impact, into the formation 16.

The displacement rate (velocity) of the probe 22 may be calculated prior to and following impact. Together with the known mass of mass 54 (which mass may be determined as the mass of the assembly to be accelerated and displaced by the biasing device 56, inclusive of the probe 22), and with these measured velocities (or using a predefined initial velocity) the kinetic energy of probe 22 prior to, and following its impact with formation 16, may be calculated.

The calculations may be simply Kinetic Energy=½ mv^2, or may and include adjustment or calibration terms determined analytically, experimentally, or from additional parameters sensed in similar time frame to the actuation of the probe 22, to adjust for seal drag, linkage losses, biasing springs, pressure effects, etc.

The resultant kinetic energy value of the probe 22 following impact with the formation 16, or more preferably the difference in kinetic energy values from before impact to after impact, may be used to determine a property of the formation, for example, its compressive strength. In some examples, the velocity or displacement of the probe 22 following impact with the formation 16 may be used directly to infer a property of the formation, and/or to correlate with other measurements regarding the formation.

In some examples, mass 54 may have mass of 50 to 500 grams. In some examples, e.g., when manufactured from dense materials such as tungsten, mass 54 may have a mass in a range from less than 1 to 5 or 10 kilograms. Lesser or greater masses may be used.

In some examples the mass 54, probe 22, linkage 60, biasing device 56, and other related elements may be designed or sized to displace the probe at a velocity of between 2 to 20 meters/second, 10 to 100 meters/second, or other rates suitable for impacting the formation 22. In one example, a mass 54 of around 0.5 kilograms may be displaced at around 2 to 6 meters/second.

In other examples, an explosive charge, a pneumatic device or an electrical actuator may be used to displace the probe 22 with enough acceleration, so that it impacts the formation 16. The scope of this disclosure is not limited to use of any particular energy storage device or technique for displacing the probe 22.

The impact can be repeated (preferably, at another location along the wellbore 12 wall) by resetting the release device 58 (so that the displacement device 36 is again engaged), and using the motor 28 to again store energy in the biasing device 56. This process can be repeated multiple times, for example, at different longitudinal positions and/or at different azimuthal orientations.

Figure 6:
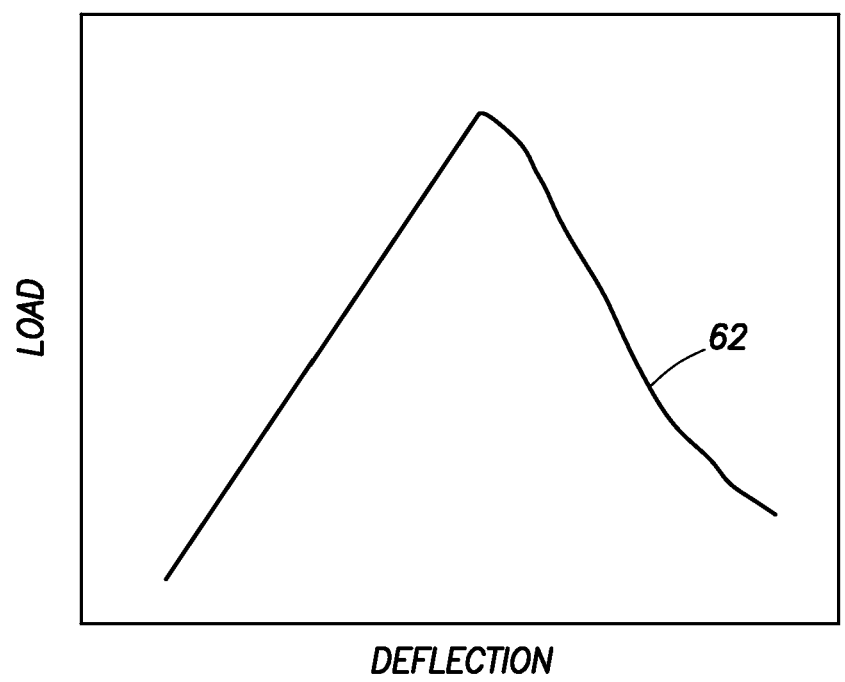
FIGS. 6 & 7 are representative plots of load versus deflection for the different formation strata.
Figure 7:
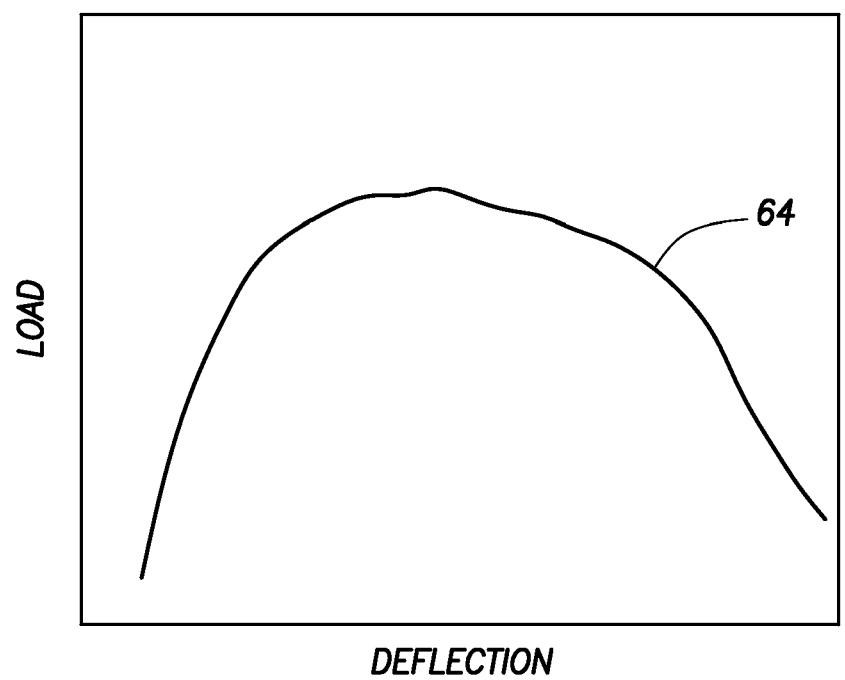

Referring additionally now to FIGS. 6 & 7, plots 62, 64 of load versus deflection are representatively illustrated for the different strata 16A,B. These plots 62, 64 depict load and deflection measurements made by the respective load and displacement sensors 38, 40 during impacts delivered by the probe 22 to the formation 16 using the instrument 20 of FIG. 5.

An area under each plot 62, 64 corresponds to energy transferred from the probe 22 to the formation 16 during the respective impacts. It will be appreciated that less energy is transferred to the strata 16B in the impact represented by plot 62, as compared to the energy transferred to the strata 16A in the impact represented by the plot 64.

Figure 8:
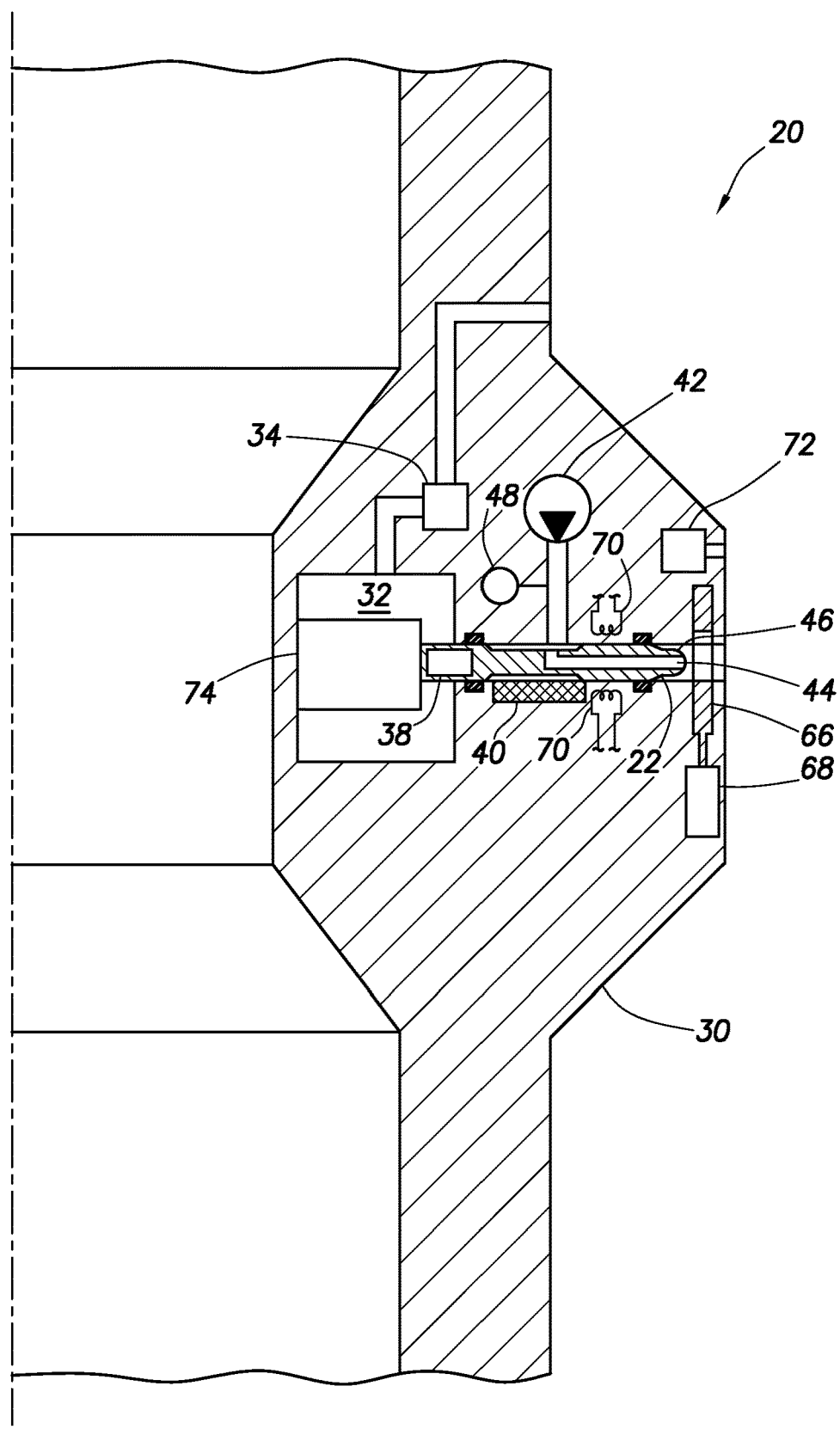
FIG. 8 is a representative cross-sectional view of another example of the test instrument.

Referring additionally now to FIG. 8, another example of the instrument 20 is representatively illustrated. In this example, a means of calibrating the sensor measurements is included in the instrument 20.

Specifically, a plate made of a known material 66 can be positioned (e.g., using an actuator 68), so that the probe 22 is displaced into contact with the material, instead of into contact with the formation 16. Since the material 66 and its properties are known, those properties can be conveniently correlated to the load and displacement measurements made by the sensors 38, 40 when the probe contacts the material, thereby calibrating the instrument 20. Then, the material 66 can be moved out of a path of the probe 22, and the probe can be displaced into contact with the formation 16.

The probe 22 can be heated by means of heaters 70 included in the instrument 20. Heating of the probe 22 may be useful in determining properties of a mud layer 84 (see FIG. 16) on the wall of the wellbore 12.

An optical sensor 72 (such as, a video camera, a still camera, an optical fiber, etc.) can be used to detect variations in the formation 16 or wellbore 12 wall (such as, faults, existing fractures, bed boundaries, etc.). The instrument 20 can be azimuthally and/or longitudinally oriented relative to these variations, with the aid of the optical sensor 72, so that the probe 22 will contact the formation at desired locations relative to the variations.

Note that in the FIG. 8 example, the motor 28 and displacement device 36 are not used. Instead, a linear actuator 74 (such as, a hydraulic, piezoelectric, magnetic, optical or solenoid-type actuator, etc.) is used to displace the probe 22 outwardly into contact with the formation 16.

In some examples, the probe 22 may have a mass of 50 to 500 grams. In some examples, e.g., when manufactured from dense materials such as tungsten, the probe 22 may have a mass in a range from less than 1 to 5 or 10 kilograms. Lesser or greater masses may be used.

In some examples, the linear actuator 74 may be designed or sized to displace the probe 22 at a velocity of between 2 to 20 meters/second, 10 to 100 meters/second, or other rates suitable for impacting the formation 22. In one example, a probe 22 having a mass of around 135 grams may be displaced at around 4 to 8 meters/second.

In the apparatus of FIG. 8, the linear actuator 74 may accelerate the probe 22, displacing outwardly, to a predefined or a measured velocity. The probe 22 may be able to be ejected from, or decoupled from, the linear actuator 74, and continue displacing outwardly at the predefined or measured velocity into contact with the formation 16.

The probe 22 may be part of an assembly including a probe base which couples to the probe 22 by a mechanical latch or magnet or other coupling feature. The probe base can engage the linear actuator 74, and can be designed to reach a maximum displacement and engage a stop, and the coupling feature, to decouple when the momentum of therobe 22 is sufficient to overcome the coupling forces, to continue outwardly to impact formation 16.

Examples of the probe 22 that eject or decouple may be tethered or at least partially retained within the instrument 20 to enable resetting the probe for a subsequent actuation. A return spring or other device may be used to bias the probe 22 to return and recouple subsequent to an actuation.

Displacement of the probe 22 may be measured at multiple times during its displacement and prior to it impacting, as it impacts, and following its impact, into the formation 16. The displacement rate (velocity) of the probe 22 may be calculated prior to and following impact.

Together with the known mass of the probe 22, and with these measured velocities (or using a predefined initial velocity) the kinetic energy of the probe prior to, and following its impact with formation 16, may be calculated. The calculations may be simply Kinetic Energy=½ mv^2, or may and include adjustment or calibration terms determined analytically, experimentally, or from additional parameters sensed in similar time frame to the actuation of the probe, to adjust for seal drag, decoupling losses, biasing springs, pressure effects, etc.

The resultant kinetic energy value of probe 22 following impact with formation 16, or more preferably the difference in kinetic energy values from before impact to after impact, may be used to determine a property of the formation, for example, its compressive strength. In some examples the velocity or displacement of the probe 22 following impact with the formation 16 may be used directly to infer a property of the formation and/or to correlate with other measurements regarding the formation.

In some examples, a 135 gram probe 22 might be used to impact the formation 16 with around 2 Nm of energy, to measure the compressive strength of formation 16 in a range from 10 to 70 N/mm2. In some examples, the energy of probe 22 may cause plastic deformation or fracturing of the formation 16, of a variable amount relating to specific local formation properties, which may be determined or inferred from, or correlate to, on an absolute or relative basis, one or more measured displacements or velocities of the probe. The result is very suitable for comparing characteristics between different locations in a borehole, or between different boreholes.

In other examples, the actuator 74 may also rotate the probe 22, so that the tip 46 drills into the wall of the wellbore 12 as it is extended outward. This technique may be used to derive a "drillability" measurement for the formation 16. For this purpose, the tip 46 could be shaped similar to a carpentry or metal working drill bit.

Figure 9:
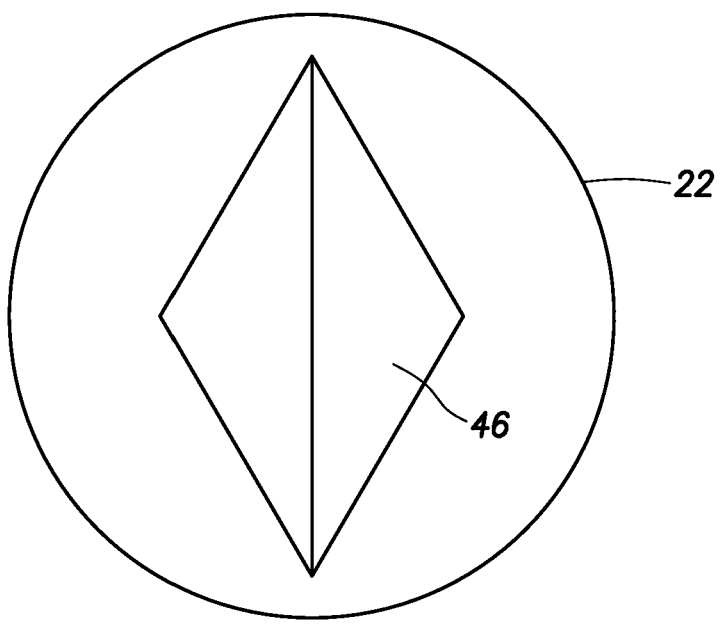
FIGS. 9 & 10 are representative end views of different probe tips that may be used with the test instrument.
Figure 10:
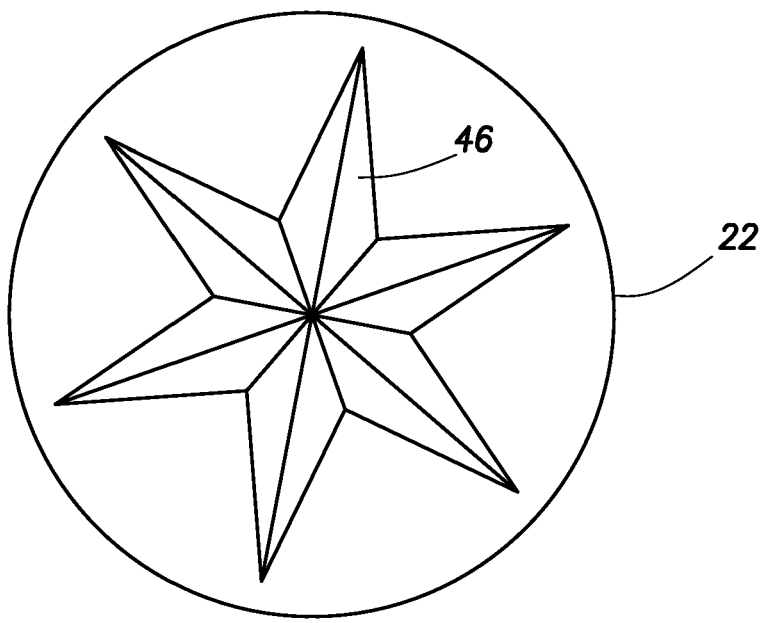

Referring additionally now to FIGS. 9 & 10, a couple of examples of different probe tips 46 are representatively illustrated in end views. The tip 46 of FIG. 9 may be useful for detecting natural fracture orientation in the formation 16.

The tip 46 of FIG. 10 may be useful where relatively brittle material is expected to be contacted by the tip.

The examples depicted in FIGS. 9 & 10 are merely a few of a wide variety of different configurations and shapes which may be used for the probe tip 46. Accordingly, the scope of this disclosure is not limited to use of any particular tip 46 on the probe 22.

Probe tips 46 used with the instrument 20 can be hardened or made of a relatively hard material, such as carbide. If an impact or drillability measurement is to be performed, then the tip 46 preferably has substantial toughness to withstand the testing operation.

Figure 11:
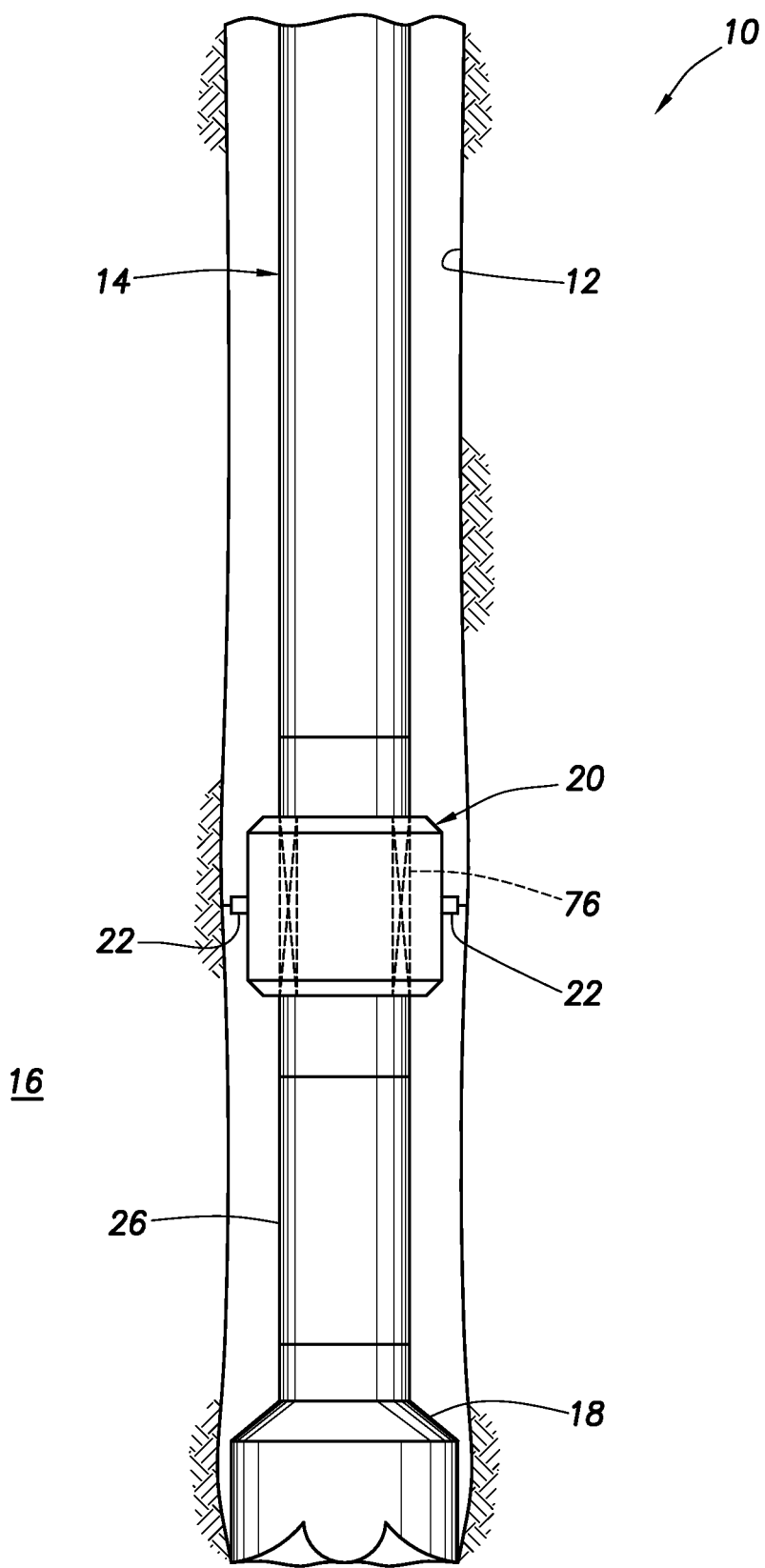
FIG. 11 is a representative partially cross-sectional view of another example of the system and method.

Referring additionally now to FIG. 11, another example of the system 10 is representatively illustrated. In this example, the instrument 20 is mounted on bearings 76, so that the instrument can rotate relative to the remainder of the drill string 14 (or, viewed differently, the remainder of the drill string can rotate relative to the instrument 20).

Thus, the instrument 20 can be used to determine mechanical properties of the formation 16, even while the drill string 14 is rotating. Note, also, that multiple azimuthally spaced apart probes 22 are included in the instrument 20 of FIG. 11.

Figure 12:
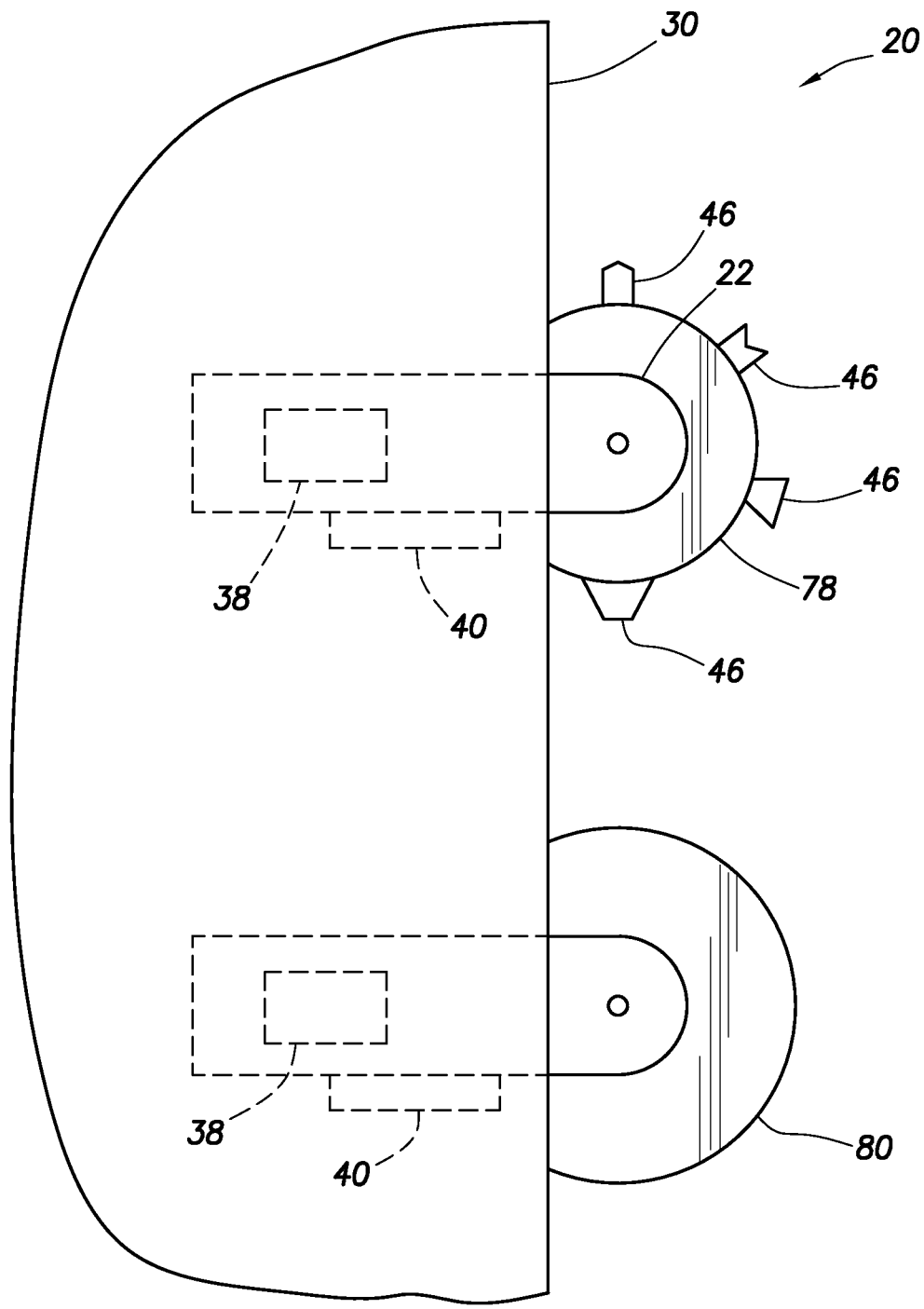
FIG. 12 is a representative side view of another example of the test instrument 20.

Referring additionally now to FIG. 12, another example of the instrument 20 is representatively illustrated in which multiple tips 46 are used on the probe 22. The probe tips 46 can be mounted to a wheel 78 which rotates as the instrument 20 is displaced longitudinally through the wellbore 12.

Instrument 20 may preferably for this and some other examples be positioned in the wellbore 12 so that the wheel 78 (or other apparatus supporting a probe) is proximate to the wellbore wall during use. One or more drill string stabilizers may be positioned proximate to the instrument 20, or the instrument may be configured to include stabilizer blades. Alternatively one or more roller reamers may be employed for this stabilizer function for reduced drag. The wheel 78 may be incorporated into a stabilizer or roller reamer blade, or into an eccentric portion of a drill string tubular, for preferred adjacency to the wellbore 12.

A biasing device (e.g., a spring) may be used to bias the wheel 78 into proximity or contact with the wellbore 12, and stabilizer or roller reamer blades opposite the wheel may react against the other side of the wellbore. In certain applications, such as horizontal drilling, the weight of the drill string 14 and of a collar on which the instrument 20 is mounted may be relied upon to maintain a substantially constant stand-off between the instrument and the wellbore 12 wall, at least in regard to low and high sides of the wellbore, and so in these cases a stabilizer type assembly may not be used.

Thus, as the wellbore 12 is being drilled, the probe 22 can be extended outwardly, and the various tips 46 can penetrate the wall of the wellbore in succession and repeatedly as the instrument displaces. In this manner, continuous measurements of the mechanical properties of the formation 16 can be made as the wellbore 12 is being drilled.

A guide wheel 80 may be used to maintain a particular desired azimuthal orientation of the instrument 20 relative to the wellbore 12. Alternatively, or in addition, the guide wheel 80 may be instrumented with sensors 38, 40 as a reference for measurements made by the sensors for the probe 22. A guide wheel 80 used as a reference may have an outer edge configured (e.g., with a narrow outer band to contact the formation) to apply sufficient contact pressure to displace the mud cake and yet not penetrate the formation 16. A pair of guide wheels 80 may be used above and below the wheel 78, and/or on either side adjacent the wheel.

Note that the probe tips 46 can be configured alike, or differently from each other, as depicted in FIG. 12. Differences between measurements made by the sensors 38, 40 when the respective different tips 46 penetrate the wellbore 12 wall can provide useful information related to the mechanical properties of the formation 16.

In some examples, a known substantially constant force may be applied to the wheel 78 (and its probe tips 46) and associated guide wheels 80, and the relative probe 22 displacement(s) into the formation 16 measured. For a constant force applied to the probe tips 46, the relative displacement of probe tips would be indicative of formation mechanical properties of interest. The force may be applied using a spring, piston, electrical biasing device, actuator or other means. The force may be adjusted from one constant level to another to accommodate changes in average formation properties from which the variability is to be studied, or to obtain a richer probe data set.

Figure 13:
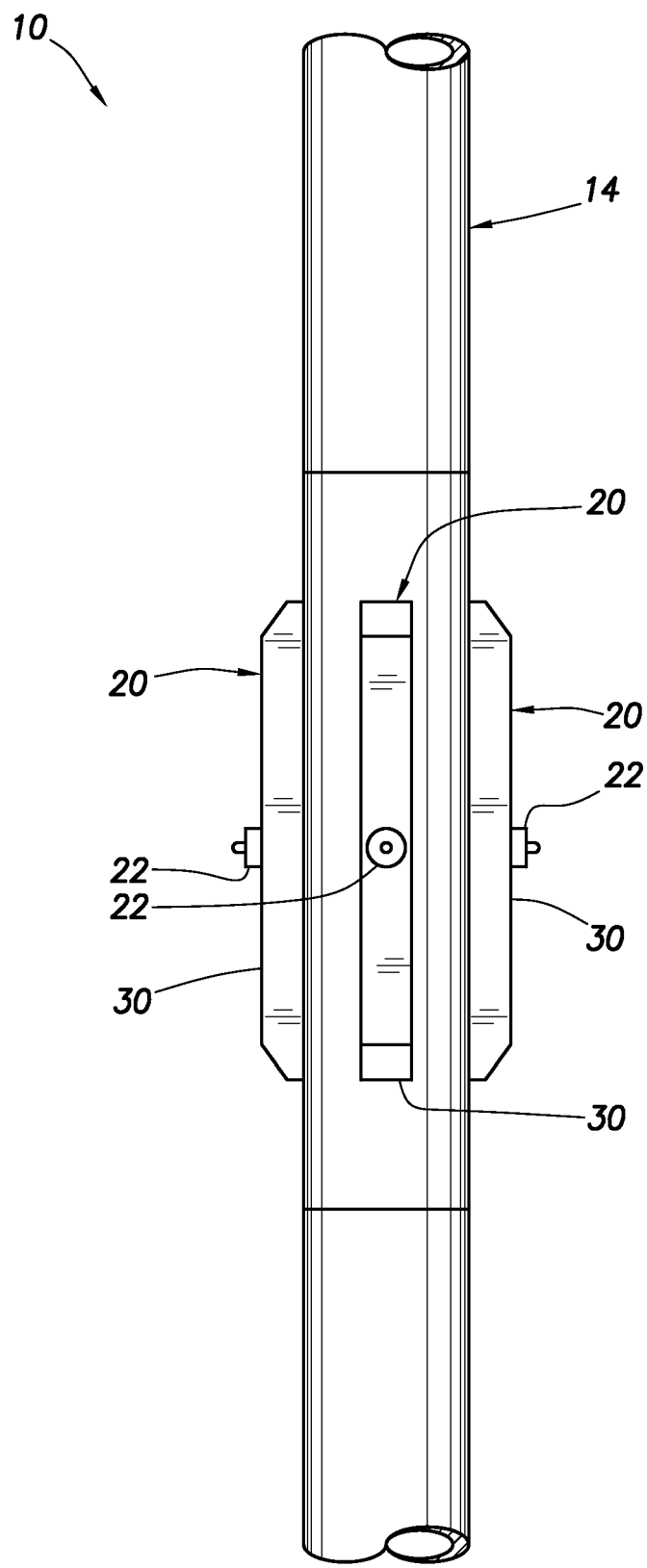
FIG. 13 is a representative elevational view of an example of a drill string which may be used in the system and method.

Referring additionally now to FIG. 13, another example of the drill string 14 is representatively illustrated, in which each of one or more instruments 20 can be extended outwardly from the drill string in one or multiple azimuthal directions. The instrument(s) 20 could be extended outwardly using, for example, extending devices of the type used in adjustable gauge drilling stabilizers. In some examples, the instrument(s) 20 may be incorporated into an adjustable gauge stabilizer.

Multiple ones of the instruments 20 can be longitudinally distributed along the drill string 14, so that multiple simultaneous tests can be performed along the wellbore 12. This can give at least a qualitative basis for comparing the measurements, to determine how the formation 16 changes along the wellbore 12.

Tests can be repeated at a single location, and/or at multiple locations. The tests can be performed under various conditions, for example, with varying hydrostatic pressures, mud pumps on or off, varying ECD (equivalent circulating density), varying surface choke pressure on the returns (e.g. in managed pressure drilling), at different temperatures, etc. Annulus pressure sensors (e.g. associated with a measurement-while-drilling (MWD) or pressure-while-drilling (PWD) system) may be used, and/or a formation pressure tester used, and the conditions may be varied (e.g., different locations, varying hydrostatic pressures, etc.) with real time feedback from these sensors, to obtain probe data when the wellbore 12 is in an underbalanced, balanced, and/or overbalanced state, as compared to measured or model predictions of formation 16 pore pressure, and similarly may be performed above and below model predictions of the fracture pressure at a location.

The probe 22 may be displaced, so that it penetrates the formation 16 at different rates. This technique may be used to determine absolute and relative differences in modulus, compressive strength, etc., which properties can vary with strain rate.

Figure 14:
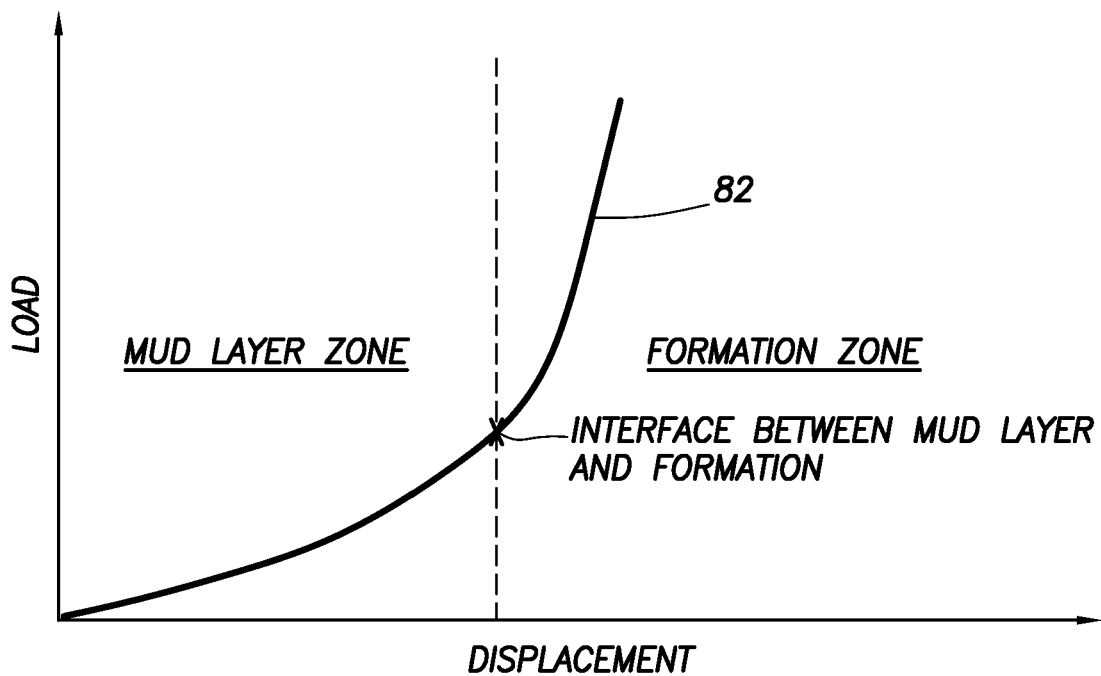
FIG. 14 is a representative plot of load versus displacement near an interface between a mud layer and the formation.

Referring additionally now to FIG. 14, an example plot 82 of load versus displacement is representatively illustrated. In this example plot 82, it may be seen that, when the probe tip 46 contacts the wall of the wellbore 12, the tip first penetrates a caked mud layer 84 (see FIG. 16).

Since the caked mud layer 84 generally is much softer than the formation 16, the load will increase at a much slower rate in the mud layer, as compared to in the formation. Thus, a substantial increase in a slope of the load versus displacement plot 82 is an indicator of an interface between the mud layer 84 and the formation 16.

In some examples, the instrument 20 could include a device which displaces the caked mud layer 84 from the wall of the wellbore 12 prior to the testing. Such device may include a brush or wiper which is dragged against the wellbore 12 wall to displace the caked mud layer 84, and which may be extendible to and retractable from the wellbore wall. Alternatively or in combination, a pump may be used to create a mud or other fluid jet focused upon the wellbore 12 to displace the caked mud layer 84.

Figure 15:
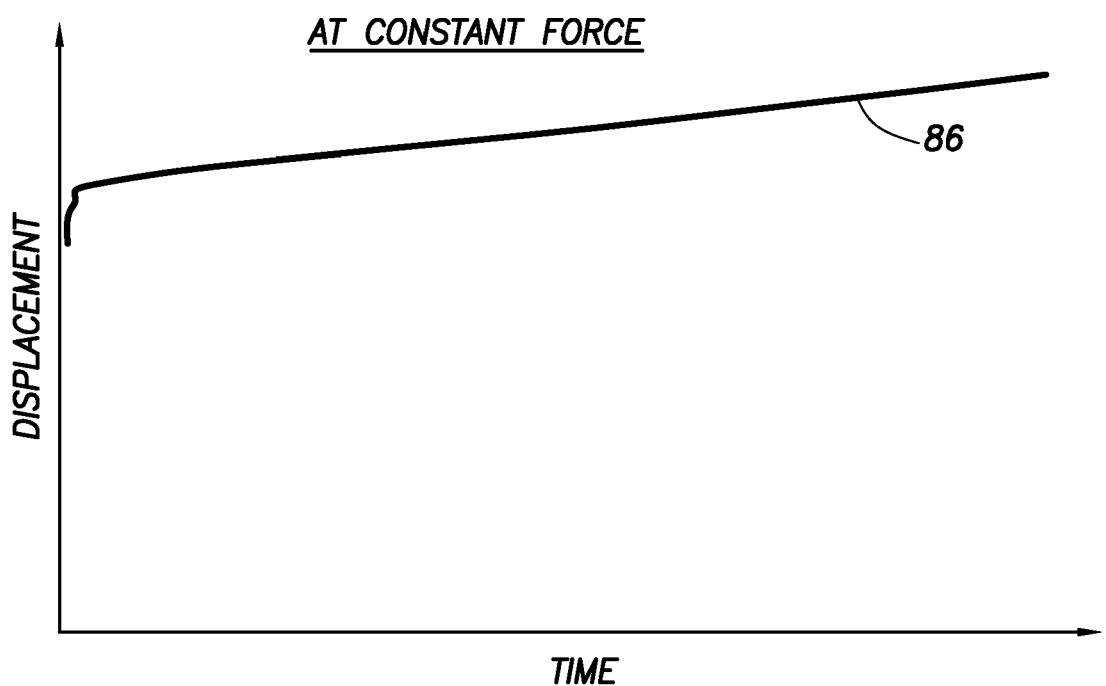
FIG. 15 is a representative plot of displacement versus time for the test instrument.

Referring additionally now to FIG. 15, an example plot 86 of displacement versus time is representatively illustrated. In this example plot 86, the load is not varied, but is instead maintained constant for an extended period of time.

Note that the displacement increases rapidly at the beginning of the plot 86, as the probe tip 46 penetrates the caked mud layer 84. However, the plot 86 then maintains a relatively consistent slope. The slope of the plot 86 in this area is indicative of a mechanical property (e.g., creep) of the formation 16. Indentation creep can be useful in determining proppant embedment effect if the formation 16 is to be later fractured.

Figure 16:
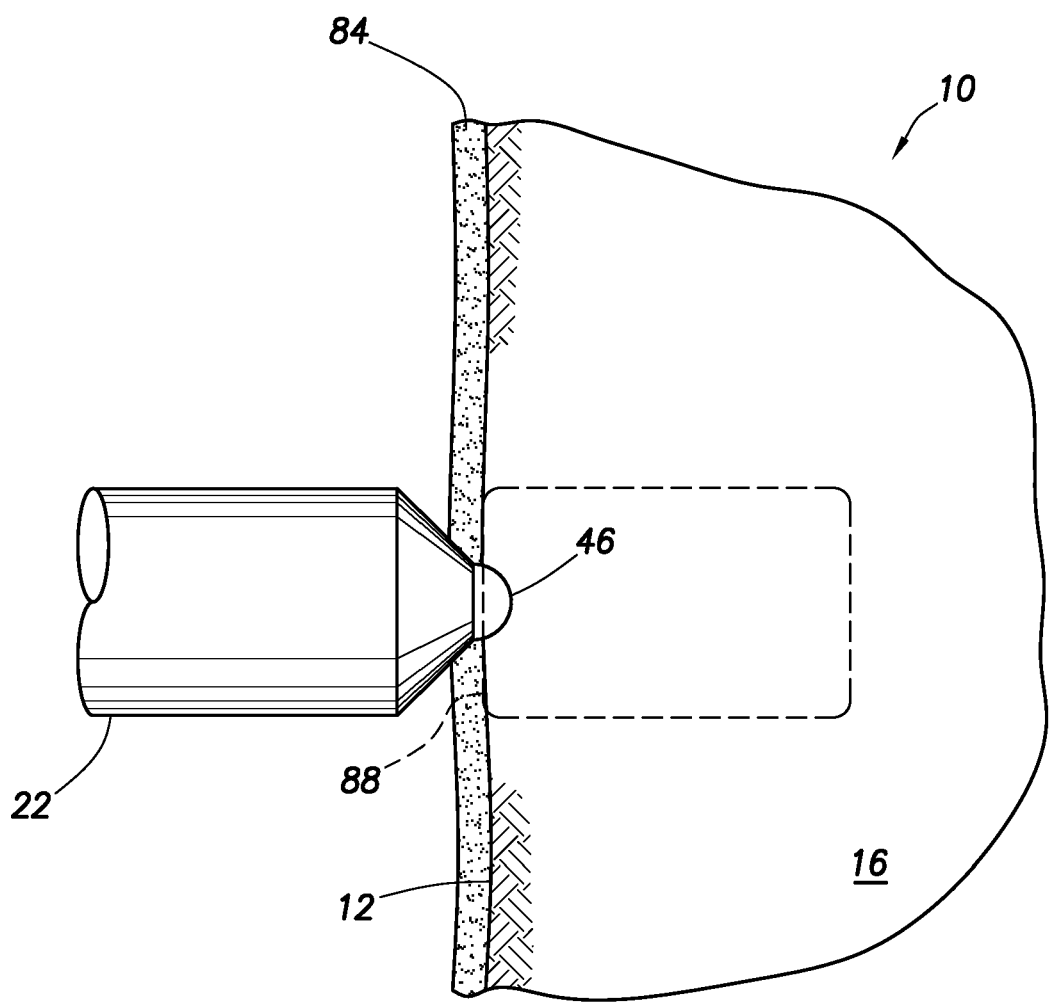
FIG. 16 is a representative partially cross-sectional view of a probe of the test instrument penetrating the formation.

Referring additionally now to FIG. 16, an enlarged scale cross-sectional view of the probe 22 in the system 10 is representatively illustrated. In this view, it may be seen that the tip 46 penetrates a section 88 of the formation 16.

Deformation of the section 88 in response to the displacement of the probe tip 46 into the section is used to determine certain mechanical properties of the formation. A shape of the tip 46 and the rest of the probe 22 can be configured to suit particular expected properties of the formation 16. For example, the tip 46 could have a larger frontal area or volume if a softer formation rock is to be tested, etc.

One benefit of the in-situ testing methods described herein is that the section 88 of the formation 16 being tested is supported on all sides (other than at the wellbore wall) by the formation itself. More specifically, the section 88 is supported by the formation 16 in all directions in planes normal to the probe 22, as well as opposing the probe. Thus, measurements made by the instrument 20 will be more representative of actual in-situ mechanical properties of the formation 16, as compared to measurements made by prior practices of removing the section 88 (such as, by use of coring tools, etc.), and then testing the removed section in a laboratory.

In an example method, the test instrument 20 may be conveyed into the borehole with the drill string 14, and data may be obtained by the instrument 20 at a plurality of locations during the drilling process. The data can be transmitted to the surface, received by a surface computer, and displayed or printed on a monitor and/or a hard copy log. The data may be displayed or printed versus a depth parameter (e.g., true vertical depth or measured depth), and may be displayed, plotted, and/or evaluated in conjunction with other data obtained at such depths for correlation or other purposes.

In some instances of this method, a decision may be made on the basis of the data or correlations to adjust the drilling path, e.g., to keep the wellbore 12 trajectory in a particular bed or strata, or to remain in a "sweet spot" of a certain range of measured parameters, which may be absolute or relative, or to steer the wellbore back to a bed or sweet spot of interest. This adjustment of the drilling path may be done using known directional drilling methods, preferably using a bent housing mud motor or a rotary steerable tool.

In some instances of this method, the data and/or correlations may be used to locate one or more zones or depths along the wellbore 12 to perforate, and/or hydraulically fracture, to promote hydrocarbon production. A further step may then be included, to perforate (with explosive charges as is known in the industry), and/or hydraulically fracture (with gelated water or other fluids pumped from surface) the formation at the identified zone or depth.

Certain key formation 16 parameters for examination can include rock brittleness, mineralogy, rock fracturability, etc. The concept of rock brittleness combines both Poisson's Ratio and Young's Modulus to reflect a rock material's capability to fail under stress and maintain a fracture once the rock fractures. For example, brittle shale is more likely to be naturally fractured, and will also be more likely to respond well to hydraulic fracturing treatments.

Figure 17:
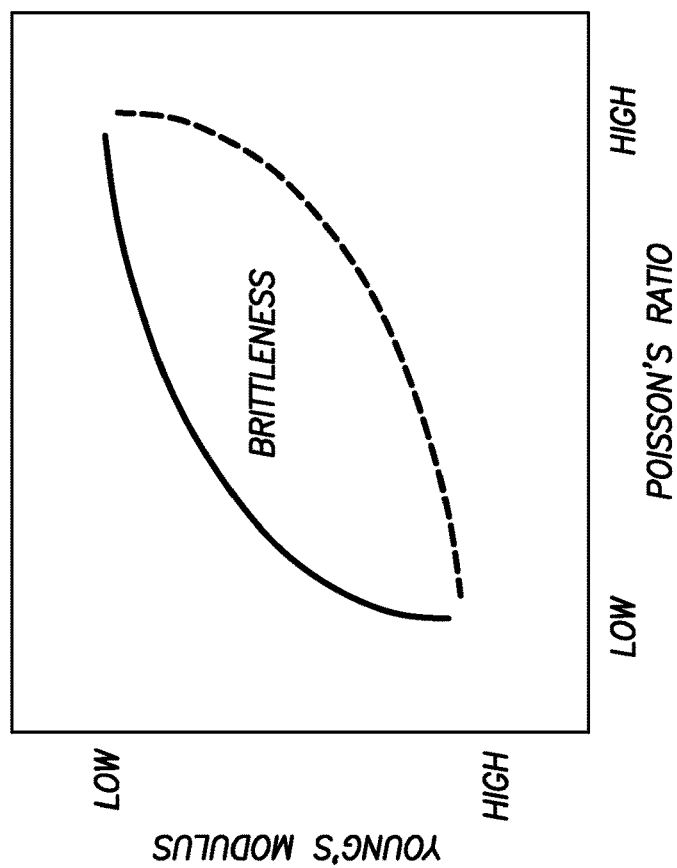
FIG. 17 is a representative plot of Poisson's ratio versus Young's modulus, showing a brittleness region.

FIG. 17 depicts an example plot of Young's Modulus versus Poisson's Ratio. A brittleness region is indicated on the plot between relatively low and high values of Poisson's Ratio, and between relatively low and high values of Young's Modulus.

Previous brittleness estimations were based mainly on core measurements in a lab, or petrophysical interpretations in the field (e.g., from drill cuttings returned to the surface, weight on bit, penetration rate, etc.). However, the in-situ test instrument 20 described here provides a downhole direct measurement of rock brittleness. This greatly increases the accuracy of in-situ rock brittleness estimations.

The in-situ indentation test described by the above disclosure can also provide understanding of proppant embedment. In certain formations, proppant embedment can be as high as several proppant-grain diameters, which reduces fracture width from 10% to 60%, with subsequent reduction in productivity from oil and gas wells.

Previous practices tried to address this problem with a laboratory proppant embedment test, or by using an onsite tester at the surface. However, it is difficult or impossible to simulate actual downhole conditions using these previous methods, considering factors such as temperature, formation fluid, in-situ stress state, etc. In contrast, the test instrument 20 described above provides reliable in-situ data for proppant selection to help reduce proppant embedment, and thereby enhance recovery.

The instrument 20 can also be used to understand fluid damage to the formation 16, including damage due to both drilling fluid and treatment fluid. By comparing different test results (such as, indentation measurement before and after applying fluid systems to the formation rocks), the influence of the fluid systems can be quantified. This approach can help in optimizing fluid selection.

Figure 18:
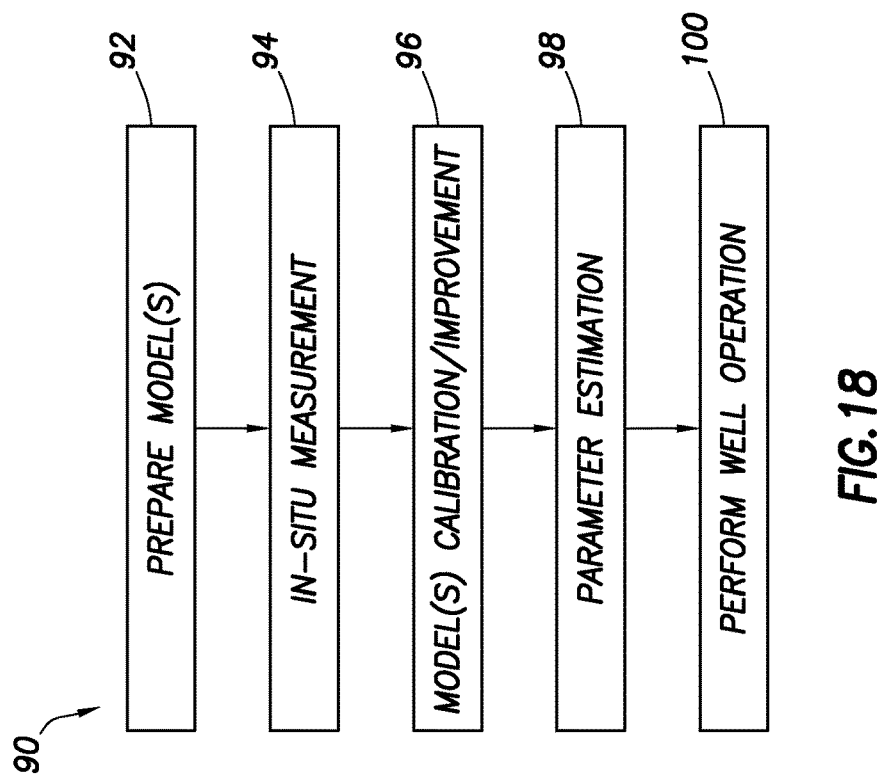
FIG. 18 is a representative flowchart for a method of using in-situ measurements from a test instrument.

FIG. 18 depicts an example flowchart for a method 90 of using the in-situ measurements from the instrument 20 (or another in-situ test instrument) to affect present and future well operations. In step 92, one or more mathematical models are prepared for estimating one or more formation parameters (such as, proppant embedment, brittleness, fracturability, fluid damage, etc.).

In step 94, the test instrument 20 is used to measure the formation properties directly, or to measure parameters which can be correlated to the formation parameters. For example, the probe 22 indentation into the wellbore 12 wall can be correlated to proppant embedment. Preferably, step 94 includes measuring a parameter related to at least one of a displacement, displacement rate, strain, and strain rate, of at least one of the probe 22 and the formation 16.

In step 96, the in-situ test results are used to calibrate and otherwise improve the models. For example, a model can be used to estimate a formation parameter, the instrument 20 can be used to make an in-situ direct or correlated measurement downhole, the measurement can be compared to the estimate, and the model can be modified as/if needed, so that the model is more capable of precisely estimating the formation parameter, either in the same well or another well. Weights or neurons of a neural network, chromosomes of a genetic algorithm, calibration coefficients of an equation, etc., may be altered in this step.

In step 98, the model is used to estimate a formation parameter for an actual well. The model used in this step is the calibrated or otherwise improved model from step 96. Of course, multiple models may be used, calibrated, improved, etc., and a single model can estimate multiple formation parameters, in keeping with the scope of this disclosure.

In step 100, a well operation is conducted, based on the formation parameter estimate generated in step 98. Thus, a drilling, stimulation, completion, injection or production operation can be performed, based at least in part on the parameter estimate. Such operations can include drill bit selection, drilling (including steering, weight on bit, torque, rotational speed, drilling fluid, etc.), fracturing, conformance, gravel packing, flooding (e.g., water or steam flood, etc.).

Figure 19:
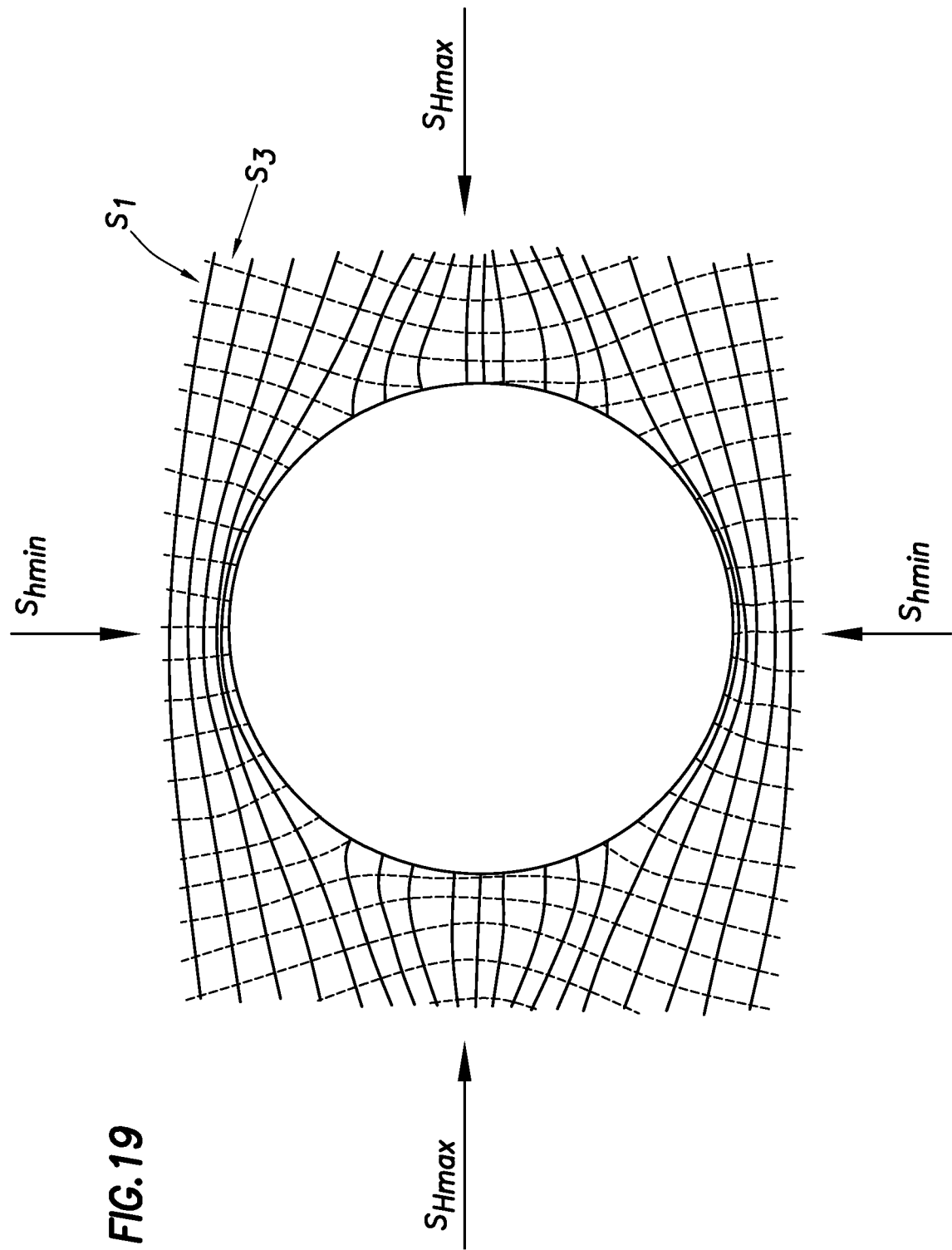
FIG. 19 is a representative plot of principal stress trajectories around a wellbore.

The instrument 20 can also be used to determine in-situ stress state, including both orientations and magnitudes of in-situ principal stresses, based on stress distribution around a wellbore 12. Depicted in FIG. 19 are example principal stress trajectories around the wellbore 12, with a biaxial stress field and based on the Kirsch equations well known to those skilled in the art. In FIG. 19, $S_{hmin}$ is minimum horizontal stress, $S_{Hmax}$ is maximum horizontal stress, $S_1$ is maximum principal stress, and $S_3$ is minimum principal stress. Note that the principal stresses are not uniform about the wellbore 12.

In-situ tests, such as the in-situ indentation test, provide different results at different locations around the wellbore 12, due to different confining stresses based on far field principal stress distribution. Compared with calibration data measured under known stress states, both orientations and magnitudes of the in-situ principal stresses can be determined.

FIG. 20 depicts a formation 16 failure envelope with different confining in-situ stresses. It will be appreciated that the confining in-situ stresses are important for determining the actual in-situ geo-mechanical properties of the formation 16. In FIG. 20, $\sigma_1$ is maximum principal stress, $\sigma_2$ is medium principal stress, and $\sigma_3$ is minimum principal stress. In laboratory or on-site surface tests (e.g., on a core sample), such confining in-situ stresses are not present.

It may now be fully appreciated that the above disclosure provides significant benefits to the art of determining mechanical properties of earth formations. In one example described above, a probe 22 is extended outwardly from a test instrument 20, so that the probe penetrates a formation 16, while sensors 38, 40 detect load applied to the probe and displacement of the probe.

A method of testing mechanical properties of an earth formation 16 is provided to the art by the above description. In one example, the method can comprise: disposing a probe 22 in a wellbore 12; impacting the probe 22 against a wall of the wellbore 12; and measuring a parameter related to at least one of a displacement, displacement rate, strain, and strain rate, of at least one of the probe 22 and the formation 16.

The impacting step can include the probe 22 at least partially penetrating the formation 16.

The method can include detecting a displacement of the probe 22 into the formation 16.

The method can include detecting a load applied to the probe 22 as the probe impacts the formation 16.

The impacting step may include displacing a mass 54 against a force exerted by a biasing device 56.

The method can include orienting the probe 22 relative to a preselected characteristic (such as, faults, natural fractures, bed boundaries, etc.) of the formation 16.

A tip 46 of the probe 22 may be non-circular and/or asymmetric.

The method may include displacing a test instrument 20 which includes the probe 22 toward the wellbore 12 wall prior to the impacting.

The method can include performing the impacting step multiple times at different azimuthal and/or longitudinal orientations.

The disposing step can include viewing the wellbore 12 wall prior to the impacting step.

Another method of testing mechanical properties of an earth formation 16 is described above. In one example, the method can include: disposing a probe 22 and a known material 66 in a wellbore 12; and after the disposing step, penetrating the known material 66 with the probe 22.

The method may include impacting the probe 22 against the known material 66.

The method may include penetrating a wall of the wellbore 12 with the probe 22 after the known material 66 penetrating.

The method can include displacing a test instrument 20 which includes the probe 22 toward the wellbore 12 wall prior to the wellbore wall penetrating step. The method of claim 15, wherein the disposing step also includes viewing the wellbore 12 wall prior to the wellbore wall penetrating step.

The method can include detecting a displacement of the probe 22 as the probe penetrates the known material 66. The method can include detecting a load applied to the probe as the probe penetrates the known material.

Yet another method of testing mechanical properties of an earth formation 16 can include the steps of: disposing a probe 22 in a wellbore 12; measuring a displacement of the probe 22 into a wall of the wellbore 12 while measuring a load applied to the probe 22; and applying fluid pressure to the formation 16 via the probe 22.

The pressure applying step may include flowing fluid through the probe 22 and/or fracturing the formation 16.

A system 10 for testing mechanical properties of an earth formation 16 is also described above. In one example, the system can include at least one probe 22 which penetrates the formation 16; an energy storage device 56 which, when released, causes the probe 22 to impact the formation 16; and a displacement sensor 40 which detects a displacement of the probe 22.

The system 10 can include a load sensor 38 which detects a load applied to the probe 22, and/or an optical sensor 72 which detects characteristics of the formation 16 and/or views the wellbore 12 wall.

The system 10 can include multiple probes 22. The probe(s) 22 may be oriented relative to a preselected characteristic of the formation 16.

The probe 22 may be included in a test instrument 20 that is displaced toward the wellbore 12 wall. The probe 22 may impact the wellbore 12 wall multiple times at different azimuthal orientations.

Another system for testing mechanical properties of an earth formation 16 is described above. In one example, the system 10 comprises: a probe 22; a displacement sensor 40 which detects displacement of the probe 22 into a wall of a wellbore 12; and a flow passage 44 in the probe 22, whereby fluid pressure is applied to the formation 16 via the probe 22.

Fluid can flow through the probe 22 and into the formation 16 via the flow passage 44. The fluid pressure may be used to fracture the formation 16.

Another method of testing mechanical properties of an earth formation 16 can comprise: disposing a probe 22 in a wellbore 12; impacting the probe 22 against a wall of the wellbore 12; acquiring data relating to the impacting; and adjusting at least one of a geomechanical model, a wellbore trajectory, a fluid property, or a completion activity, in response to the data.

The completion activity may comprise perforating and/or fracturing.

The adjusting step can include varying a proppant property, selecting a drill bit 18 based on the data, and/or steering a drill bit 18 based on the data.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of testing mechanical properties of an earth formation, the method comprising:
    disposing a probe in a wellbore;
    measuring a displacement of the probe into a wall of the wellbore while measuring a load applied to the probe;
    applying fluid pressure to the formation by flowing a fluid through a fluid passage in the probe and into the formation; and
    determining a mechanical property of the formation based on the fluid pressure applied to the formation.

2. The method of claim 1, further comprising orienting the probe relative to a preselected characteristic of the formation.

3. The method of claim 1, wherein applying fluid pressure comprises fracturing the formation.

4. A method of testing mechanical properties of an earth formation, the method comprising:
    disposing a probe in a wellbore;
    impacting the probe against a wall of the wellbore;
    acquiring data relating to the impacting;
    determining a mechanical property of the formation from the data; and
    adjusting at least one of a geomechanical model, a wellbore trajectory, a fluid property, or a completion activity, in response to the mechanical property.

5. The method of claim 4, wherein the completion activity comprises at least one of perforating or fracturing.

6. The method of claim 4, wherein the adjusting comprises at least one of varying a proppant property, selecting a drill bit based on the data, or steering a drill bit based on the mechanical data.

7. The method of claim 4, wherein the impacting comprises the probe at least partially penetrating the formation.

8. The method of claim 4, further comprising detecting at least one of a displacement of the probe into the formation or a load applied to the probe as the probe impacts the formation.

9. The method of claim 4, wherein the impacting comprises displacing a mass against a force exerted by a biasing device.

10. The method of claim 4, further comprising orienting the probe relative to a preselected characteristic of the formation.

11. The method of claim 4, further comprising performing the impacting multiple times at at least one of different azimuthal orientations or different longitudinal positions.

* * * * *